United States Patent

[11] 3,621,057

[72] Inventors Helmut Weber
Frankfurt am Main;
Walter Aumuller, Kelkheim, Taunus; Rudi Weyer, Frankfurt am Main, Karl Muth, Kelkheim, Taunus; Felix Helmut Schmidt, Mannheim-Neuostheim, all of Germany
[21] Appl. No. 597,539
[22] Filed Nov. 29, 1966
[45] Patented Nov. 16, 1971
[73] Assignee Farbwerke Hoechst Aktiengesellschaft vormals Meister Lucius & Bruning
Frankfurt am Main, Germany
[32] Priority Dec. 2, 1965
[33] Germany
[31] F 47,816

[54] BENZENESULFONYL-UREAS AND PROCESS FOR THEIR MANUFACTURE
12 Claims, No Drawings
[52] U.S. Cl. .................................................. 260/553 DA, 260/327 TH, 260/347.3, 260/999, 260/345.7
[51] Int. Cl. ........................................................ C07c 127/00
[50] Field of Search ........................................ 260/553 D, 553 DA

[56] References Cited
UNITED STATES PATENTS
3,384,757 5/1968 Ruschig et al. ............... 260/553
FOREIGN PATENTS
654,561 4/1965 Belgium ........................ 260/553
815,885 7/1959 Great Britain ................ 260/553

OTHER REFERENCES
German Auslegeschrift No. 1185 180, 1/14/65, Farbwerke Hoechst Aktiengesellschaft.

Primary Examiner—Bernard Helfin
Assistant Examiner—Gerald A. Schwartz
Attorney—Curtis, Morris & Safford ABSTRACT: Benzenesulfonyl-ureas of the formula

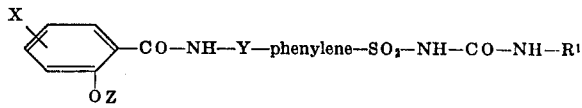

in which $R^1$ is alkyl or alkenyl of 2 to 8 carbon atoms, cycloalkyl of 5 to 8 carbon atoms, cyclohexyl-lower alkyl, lower alkyl-cyclohexyl, lower alkoxy-cyclohexyl, phenyl-lower alkyl, endoalkylene-cyclohexyl, endoalkylene-cyclohexenyl, endoalkylene-cyclohexylmethyl or endoalkylene-cyclohexenylmethyl having 1 to 2 carbon atoms in the endoalkylene moiety, cyclohexenyl or cyclohexenylmethyl; Y is an alkylene of 1 to 4 carbon atoms; Z is phenyl or p-tolyl; and X is hydrogen, methyl, chloro or nitro substituted in the 4- or 5-position; and physiologically tolerable salts thereof are disclosed as having utility as orally administrable hypoglycemic agents in the treatment of diabetes mellitus.

BENZENESULFONYL-UREAS AND PROCESS FOR THEIR MANUFACTURE

The present invention provides benzenesulfonyl-ureas of the formula

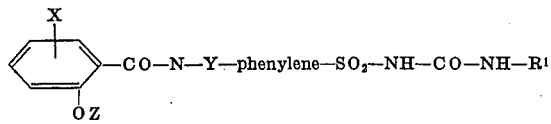

which in free form or in the form of their salts have blood sugar lowering properties and which are distinguished by a strong and long-lasting hypoglycemic action.

In the above formula

R represents hydrogen, low molecular weight alkyl or low molecular weight phenyl-alkyl, $R^1$ represents a. alkyl, alkenyl or mercapto-alkyl containing two to eight carbon atoms, b. alkoxy-alkyl, alkyl-mercaptoalkyl or alkyl-sulfinylalkyl containing four to eight carbon atoms of which at least two belong to the alkylene part of the alkoxy-alkyl, alkyl-mercaptoalkyl or alkyl-sulfinylalkyl group, c. low molecular weight phenyl-alkyl, phenyl-cyclopropyl, d. low molecular weight cyclohexyl-alkyl, cycloheptyl-methyl, cycloheptyl-ethyl or cyclooctyl-methyl, e. endoalkylene-cyclohexyl, endoalkylene-cyclohexenyl, endoalkylene-cyclohexylmethyl or endoalkylene-cyclohexenylmethyl containing one to two carbon atoms in the endoalkylene part, f. low molecular weight alkyl-cyclohexyl, low molecular weight alkoxy-cyclohexyl, g. cycloalkyl containing five to eight carbon atoms, h. cyclohexenyl, cyclohexenylmethyl, i. a heterocyclic ring containing four to five carbon atoms and one oxygen or one sulfur atom and up to two ethylenic double bonds, or k. a heterocyclic ring containing four to five carbon atoms and one oxygen or two sulfur atom and up to two ethylenic double double said heterocyclic ring being linked to the nitrogen atom by means of a methylene group, Y represents a hydrocarbon chain containing one to four carbon atoms, Z represents a phenyl group which may carry a low molecular weight alkyl group, a low molecular weight alkoxy group or a $CF_3$ group or 1 chlorine, bromine, or fluorine atom, X represents halogen, low molecular weight alkyl, low molecular weight alkoxy, $-CF_3$ or $-NO_2$ or also hydrogen, the group X preferably standing in the 4- or in the 5-position.

The term "low molecular weight alkyl" is used throughout the specification to mean an alkyl radical containing one to four carbon atoms in a straight or branched chain.

In correspondence with the definitions given above, R may represent, for example, methyl, ethyl, propyl, isopropyl, butyl, isobutyl, tert. butyl, benzyl, α- or β-phenyl-ethyl, α-, β- or γ-phenyl-propyl. Compounds in which R represents methyl or benzyl and especially those in which R represents hydrogen are preferred.

$R^1$ may represent, for example, ethyl, propyl, isopropyl, butyl, isobutyl, sec. butyl, straight chain or branched amyl (pentyl), hexyl, heptyl or octyl, furthermore, it may represent radicals which correspond to the aforementioned hydrocarbon radicals and which contain an ethylenic double bond, for example, allyl or crotyl; furthermore alkyls containing two to eight carbon atoms and one mercapto group, for example β-mercapto-ethyl, or higher mercapto-alkyls. Furthermore, $R^1$ may represent γ-methoxypropyl, δ-methoxy-n-butyl, β-ethoxyethyl, γ-ethoxy-propyl, δ-ethoxybutyl or higher alkyloxy-ethyls, -propyls or -butyls, and the corresponding groups carrying a sulfur atom or the member –SO– instead of the oxygen atom. Furthermore, $R^1$ may represent: benzyl, α-phenyl-ethyl, β-phenyl-ethyl, α-, β- or γ-phenyl-propyl or phenyl-butyls.

Within the scope of the present invention, there are particularly preferred compounds containing as $R^1$ a cycloaliphatic hydrocarbon group which may be substituted by alkyl or alkoxy or which may be linked to the nitrogen atom by means of an alkylene group. As examples of such groups, there may be mentioned cyclopentyl, cyclohexyl, cycloheptyl, cyclooctyl, methyl-cyclohexyl, ethyl-cyclohexyl, propyl-cyclohexyl and isopropyl-cyclohexyl, methoxy-cyclohexyl, ethoxy-cyclohexyl, propoxy-cyclohexyl and isopropoxy-cyclohexyl; the alkyl or alkoxy groups may be present in the 2-, 3- or, preferably in the 4-position, and in the cis as well as in the trans position. Furthermore, there may be mentioned cyclohexylmethyl, α- or-β-cyclohexyl-ethyl, cyclohexylpropyls, endomethylene-cyclohexyl (2,2,1-bicycloheptyl), endoethylene-cyclohexyl (2,2,2-bicyclo-octyl), endomethylene-cyclohexenyl, endoethylene-cyclohexenyl, endomethylene-cyclohexylmethyl, endoethylene-cyclohexylmethyl, endomethylene-cyclohexenylmethyl or endoethylene-cyclohexenylmethyl, α- or β-phenyl-cyclopropyl, in the cis or in the trans form. Finally, $R^1$ may represent heterocyclic rings which contain, in addition to four to five carbon atoms, one oxygen or one sulfur atom and up to two double bonds and which may be bound to the adjacent nitrogen atom by a methylene group.

Examples of such heterocyclic rings are:

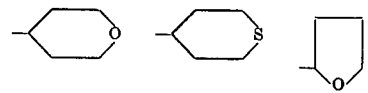

Examples of the bridge member Y are:

$CH_2$–, $-CH_2-CH_2$–, $-CH(CH_3)$–, $-CH_2-CH_2-CH_2$, $-CH(CH_3)-CH_2$–, $-CH_2-CH(CH_3)$–, $-C(CH_3)_2$–, $-CH_2-CH_2-CH_2-CH_2$–, $-CH(CH_3)-CH_2-CH_2$–, $-CH_2-CH(CH_3)-CH_2$–, $-CH_2-CH_2-CH(CH_3)$–, $-CH(CH_3)-CH(CH_3)$–, $-C(CH_3)_2$–, $-CH_2-C(CH_3)_2$–, $-CH(C_2H_5)$–, $C(CH_3)(C_2H_5)$–, wherein $-CH_{2-2}$–, $-CH(CH_3)-CH_2$– and $-CH_2-CH_2-CH(CH_3)$– are preferred.

The phenylene radical indicated in the formula by -phenylene- is preferably unsubstituted, but may also be substituted by one or more substituents selected from halogen atoms, low molecular weight alkyl groups or low molecular weight alkoxy groups. It may contain the remaining parts of the molecule in o-, m- or para-position to one another, the para-position being preferred.

The present invention furthermore provides a process for the manufacture of the above-identified benzenesulfonyl-ureas. Thus, the benzenesulfonyl-ureas of the present invention can be prepared by a. reacting benzenesulfonyl-isocyanates, benzenesulfonyl-carbamic acid esters, benzenesulfonyl-thiolcarbamic acid esters, benzenesulfonyl-ureas, benzenesulfonyl-semicarbazides or benzenesulfonyl-semicarbazones carrying the substituent

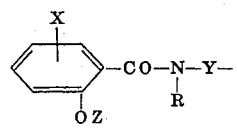

with $R^1$-substituted amines or their salts;

b. reacting benzene-sulfonamides of the formula

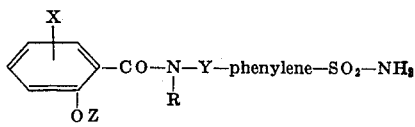

or their salts with R¹-substituted isocyanates, carbamic acid esters, thiolcarbamic acid esters, carbamic acid halides or ureas,
  c. hydrolizing correspondingly substituted benzenesulfonyl-isourea ethers, benzensulfonyl-isothiourea esters, benzenesulfonyl-isothiol-urea ethers, benzenesulfonyl-parabanic acids or benzenesulfonyl-haloformic acid amidines,
  d. fixing water to correspondingly substituted carbodiimides,
  e. in correspondingly substituted benzenesulfonyl-thioureas, replacing the sulfur atom by an oxygen atom,
  f. introducing by acylation the radical

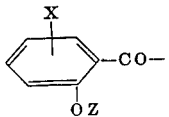

in one or several steps into benzenesulfonyl-ureas of the formula

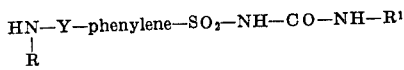

and, if desired, converting the reaction products into salts by treatment with alkaline agents.

Depending on the nature of the group

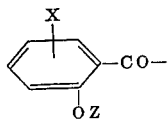

one or more of the aforesaid processes may in certain cases be unsuitable for the preparation of some individual compounds covered by the general formula. These particular cases which are relatively unusual and are easily recognized by the expert, so that it is not difficult to select another successful method of synthesis from those described above.

Instead of the benzenesulfonyl-isocyanates, there may also be used reaction products of benzenesulfonyl-isocyanates with acid amides such as caprolactam or butyrolactam, furthermore with weakly basic amines such as carbazols.

The above-mentioned benzenesulfonyl-carbamic acid esters or benzenesulfonyl-thiolcarbamic acid esters may contain in the alcohol component an alkyl group or an aryl group or even a heterocyclic group. Since this group is separated during the reaction, its chemical constitution has no influence on the character of the final products and may, therefore, be varied within wide limits. The same applies to the R¹-substituted carbamic acid esters or to the corresponding thiolcarbamic acid esters.

As carbamic acid halides, the chlorides are advantageously used.

The benzenesulfonyl-ureas used as starting substances in the process of the present invention may be unsubstituted at the side of the urea molecule opposite to the sulfonyl group or may be monosubstituted or, particularly, disubstituted. Since these substituents are separated during the reaction with amines, their character may be varied within wide limits. In addition to benzenesulfonyl-ureas which are substituted by alkyl, aryl, acyl or heterocyclic groups, there may also be used bis-(benzenesulfonyl)-ureas or bis-(benzenesulfonyl)-ureas which carry a further substituent, for example, a methyl group, at one of the nitrogen atoms. For example, bis(benzene-sulfonyl)-ureas or also N-benzenesulfonyl-N'-acyl ureas may be treated with cyclohexylamine or with p-methyl-cyclohexylamine and the salts obtained may be heated to elevated temperatures, in particular to temperatures above 100° C.

Furthermore, it is possible to start from ureas of the formula R¹—NH—CO—NH₂ or from ureas which carry one or, especially two substituents at the free nitrogen atom and to react these with

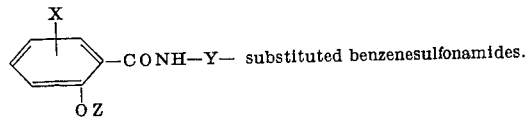

As such starting substances, there may be used, for example, N-cyclo-hexyl-urea or N-(4-methyl-cyclohexyl)-urea, the corresponding N'-acetyl-, N'-nitro-, N'-cyclohexyl-, N'-(4-methyl-cyclohexyl)-, N',N'-diphenyl- (wherein both phenyl radicals may also be substituted or linked with one another either directly or over a bridge member such as —CH₂—, —NH—, —O— or —S—), N'-methyl-N'-phenyl-, N',N'-dicyclohexyl-ureas and Y-substituted cyclo-hexyl-carbamoyl-imidazoles or -triazoles.

The hydrolysis of the benzenesulfonyl-parabanic acids, benzenesulfonyl-isourea ethers, benzenesulfonyl-isothiourea ethers, benzenesulfonyl-isourea esters or benzenesulfonyl-haloformic acid amidines mentioned as starting substances is suitably carried out in an alkaline medium. Isourea ethers and isourea esters may also be hydrolized successfully in an acid medium.

In the correspondingly substituted benzenesulfonyl-thioureas the sulfur atom can be replaced by an oxygen atom, for example, with the aid of oxides or salts of heavy metals or also by the use of oxidizing agents such, for example, as hydrogen peroxide, sodium peroxide or nitrous acid.

The thioureas can also be desulfurized by treatment with phosgene or phosphorus pentachloride. Chloroformic acid amidines or chloroformic acid carbodiimides obtained as intermediate products can be converted into benzensulfonyl-ureas by an appropriate treatment, for example, by hydrolysis or the addition of water.

In analogous manner as the thioureas behave the isothiolurea ethers which, in the sense of the invention, are equivalent as starting substances for the desulfurizing reactions.

The acylation of aminoethyl-benzenesulfonyl-ureas may be carried out either in one step, for example, by reaction of correspondingly substituted benzoic acid halides, or it may be carried out in several steps. One example of the numerous possibilities of stepwise acylation is the reaction of corresponding aminoethyl-benzenesulfonyl-ureas with 2-alkoxy- or 2-aryloxy-benzoyl chloride and following introduction of a halogen atom into the benzene nucleus of the benzamido group or the introduction of a correspondingly substituted thio-benzoyl group and the conversion of the reaction product into the corresponding benzamide derivative.

With regard to the reaction conditions, the manner of carrying out the process of the present invention may, in general, vary within wide limits and can be adapted to each individual case. For example the reactions may be carried out with the use of solvents, at room temperature or at an elevated temperature.

As starting substances, there may be used compounds containing a benzene radical substituted by the group

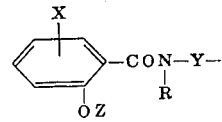

As the part

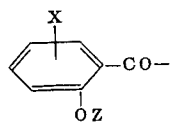

of this formula there may be mentioned

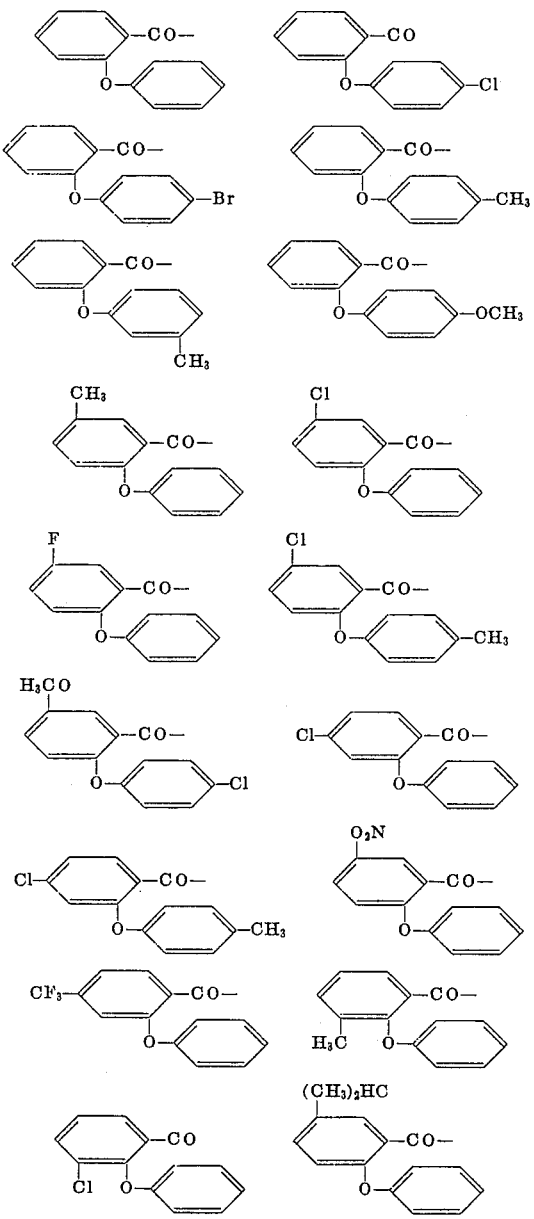

The benzenesulfonyl-ureas of the present invention are valuable medicaments characterized by a strong and, in particular, a long-lasting blood sugar lowering action.

Their hypoglycemic action was determined in rabbits by feeding to them the products of the invention in doses of 10 mg./kg. and determining the blood sugar value according to the known method of Hagedorn-Jensen or by means of an autoanalyser over a prolonged period.

Thus, it is observed, for example, that 10 mg./kg. of N-[4-(β-<2-phenoxy-benzamido>-ethyl)-benzenesulfonyl]-N'-(4-methyl-cyclohexyl)-urea provoke after 3 hours a blood sugar lowering of 25 percent; and after 24 hours the lowering amounts to still 25 percent, whereas the known N-(4-methyl-benzenesulfonyl)-N'-butyl ureas, when administered to rabbits in doses of less than 25 mg./kg., does not provoke a lowering of the blood sugar level. The strong hypoglycemic action of the benzene-sulfonyl-ureas of the present invention becomes more evident if the dose is further reduced. When N-[4-(β-<2-phenoxy-5-methyl-benzamido>-ethyl)-benzenesulfonyl]-N'-cyclohexyl-urea is administered to rabbits in a dose of 0.05 mg./kg. and N-[4-(β-<2-phenoxy-benzamido>-ethyl)-benzenesulfonyl]-N'-cyclohexyl-urea is administered to rabbits in a dose of 0.06 mg./kg., a distinct lowering of the blood sugar can still be observed.

The benzenesulfonyl-ureas described are preferably used for the manufacture of orally administrable pharmaceutical preparations for the lowering of the blood sugar level in the treatment of diabetes mellitus; they may be used as such or in the form of their physiologically tolerable salts or in the presence of substances which cause such salt formation. For the formation of salts, there may be used, for example, alkaline agents such as alkali metal hydroxides or alkaline earth metal hydroxides, alkali metal carbonates or bicarbonates or alkaline earth metal carbonates or bicarbonates which are commonly used in the pharmaceutical industry to form physiologically tolerable salts.

The invention, therefore, also provides pharmaceutical preparations of the above kind which comprise a benzenesulfonyl-urea of the present invention in admixture or conjunction with a pharmaceutically suitable carrier.

The pharmaceutical preparations are advantageously in the form of tablets containing, in addition to the products of the present invention, the usual pharmaceutically suitable carriers such as talc, starch, lactose, tragacanth or magnesium stearate.

A pharmaceutical preparation containing one of the aforesaid benzenesulfonyl-ureas as the active substance, for example, a tablet or a powder, with or without the aforesaid carriers, is advantageously brought into a suitable unit dosage form. The dose chosen should comply with the activity of the benzenesulfonyl-urea used and the desired effect. Advantageously, the dosage per unit amounts to about 0.5 to 100 mg., preferably 2 to 10 mg., but considerably higher or lower dosage units may also be used which, if desired, are divided or multiplied prior to their administration.

The following examples illustrate the invention, but they are not intended to limit it thereto:

EXAMPLE 1

N-[4-(β-<2-phenoxy-benzamido>-ethyl)-benzenesulfonyl]-N'-cyclohexyl-urea 9.9 g. of 4-(β-<2-phenoxy-benzamido>-ethyl)-benzenesulfonamide (melting point 187°–188° C., prepared from 2-phenoxy-benzoid acid chloride and 4-(β-aminoethyl)-benzenesulfonamide) are suspended in a mixture of 12.5 ml. of a 2N sodium hydroxide solution and 50 ml. of acetone; 3.3 g. of cyclohexyl-isocyanate are added dropwise, at 0°–5° C. to this suspension. The whole is stirred for 3 hours at room temperature, the reaction mixture is diluted with water, undissolved matter is filtered off and the filtrate is acidified with dilute hydrochloric acid. The N-[4-(β-<2-phenoxy-benzamido>-ethyl)-benenesulfonyl]-N'-cyclohexyl-urea, which separates in crystalline form, melts after recrystallization from methanol at 168°–170° C.

In analogous manner, there are obtained

N-[4-(β-<2-phenoxy-benamido>-ethyl)-benzenesulfonyl]-N'-(4-methylcyclohexyl)-urea (trans), melting point 186°–188° C. (from methanol) and N-[4-(β-<2-phenoxy-benzamido>-ethyl-benzenesulfonyl]-N'-butyl urea, melting point 138°–140° C. (from methanol);

from 4-(β-<2-(4-methyl-penoxy)-benzamido>-ethyl)-benzene-sulfonamide (melting point 176°–177° C.);

N-[4-(β-<2-(4-methyl-penoxy)-benzamido>-ethyl)-benzenesulfonyl]-N'-(4-methyl-cyclohexyl)-urea (trans), melting point 174°–176° C. (from methanol);

from 4-(β-<2-phenoxy-4-chloro-benzamido>ethyl)benzenesulfonamide (melting point 191°–192° C.):

N-[4(β-<2-phenoxy-4-chloro-benzamido>-ethyl)benzenesulfonyl)]-N'-cyclohexyl-urea, melting point 168°–169° C. (from methanol) and N-[4-(β-<2-phenoxy-4-chloro-benzamido>-ethyl)-benzenesulfonyl]-N'-(4-methyl-cyclohexyl)-urea (trans), melting point 155°–156° C. (from methanol);

from 4-(β-<2-(4-methyl-phenoxy)-4-chloro-benzamido>-ethyl)-benzenesulfonamide (melting point 189°–190° C.):

N-[4-(β-<2-(4-methyl-phenoxy)-4chloro-benzamido>-
  ethyl)-benzenesulfonyl]-N'-cyclohexyl-urea, melting
  point 114°–116° C. (decomposition) (from methanol),
N-[4-(β-<2-(4-methylphenoxy)-4-chlorobenzamido>-
  ethyl)-benzenesulfonyl]-N'-butyl-urea, melting point
  134°–136° C. (from methanol) and
N-[4-(β-<2-(4-methyl-phenoxy-)-4-chloro-benzamido>-
  ethyl)-benzenesulfonyl]-N'-(4-methyl-cyclohexyl)-urea
  (trans), melting point 166°–168° C. (from methanol);
from 4-(β-<2-phenoxy-5-chloro-benzamido>-ethyl)-
  benzenesulfonamide (melting point 156°–158° C.):
N-[4-(β-<2-phenoxy-5-chloro-benzamido>-ethyl)-
  benzenesulfonyl]-N'-cyclohexyl-urea, melting point
  175°–177° C. (from a mixture of methanol and dimethyl-
  formamide) and
N-[4-(β-<2-phenoxy-5-chloro-benzamido>-ethyl-
  benzenesulfonyl]-N'-(4-methyl-cyclohexyl)-urea (trans),
  melting point 143°–145° C. (from methanol);
from 4-(β-<2-phenoxy-5-nitro-benzamido>-ethyl)-
  benzenesulfonamide (melting point 159°–160° C.):
N-[4-(β-<2-phenoxy-5-nitro-benzamido>ethyl-
  benzenesulfonyl]-N'-cyclohexyl-urea, melting point
  134°–136° C. (from methanol) and
N-[4-(β-<2-phenoxy-5-nitro-benzamido>-ethyl)-
  benzenesulfonyl] -N'-(4-methyl-cyclohexyl)-urea
  (trans), melting point 167°–169° C. (from methanol).

EXAMPLE 2

N-[4-(β-<2-phenoxy-5-methyl-benzamido>-ethyl)-
benzenesulfonyl]-N'-cyclohexyl-urea 9.4 g. of N-[4-(β-<2-phenoxy-5-methyl-
benzamido>ethyl)-benzenesulfonyl]-methyl-urethane (melt-
ing point 165°–167° C.) are suspended in 150 ml. of xylene; 2
g. of cyclohexylamine are added at 80° C. to this suspension.
The whole is then heated to 140° C., while stirring vigorously,
and kept for one hour at this temperature, during which time
the methanol formed separates by distillation. After cooling,
the solvent is decanted and the oily residue is triturated with
methanol. The crystals thus obtained, constituting N-[4-(β-
<2-phenoxy-5-methyl-benzamido>-ethyl)-benzenesulfonyl]-
N'-cyclohexyl-urea, are recrystallized from methanol and melt
at 129°–131° C.

In analogous manner, there is obtained
N-[4-(β-<2-phenoxy-5-methyl-benzamido>-ethyl)-
benzenesulfonyl]-N'-(4-ethyl-cyclohexyl)-urea (trans), melt-
ing point 153°–154° C. (from methanol).

EXAMPLE 3

N-[4-(β-<2-phenoxy-benzamido>-ethyl)-benzenesulfo-
nyl]-N'-cyclohexyl-urea 7.4 g. of N,N-diphenyl-N'-cyclohexyl-urea and 10.5 g. of
the sodium salt of 4-(β-<2-phenoxy-benzamido>-ethyl)-
benzenesulfonamide are heated for 7 hours in an oil bath
to 100° C., in 25 ml. of dimethylformamide. When the
solution has cooled, it is combined with water, sodium
hydroxide solution is added and the diphenyl-amine that
has formed is extracted with ether. The aqueous solution
is filtered and acidified with dilute hydrochloric acid. The
reaction product is separated by filtration with suction
and recrystallized from methanol. N-[4-(β-<2-phenylox-
y-benzamido>-ethyl)-benzenesulfonyl>-N'-cyclohexyl-
urea melts at 168°–170° C.

EXAMPLE 4

N-[4-(β-<2phenoxy-benzamido>-ethyl)-benzenesulfonyl]-
N'-cyclohexyl-urea a. 2 g. of N-[4-(β-<2-phenoxy-benzamido>ethyl)-
benzenesulfonyl]-N'-cyclohexyl-thiourea (melting point
148°–150° C., from a mixture of methanol and dioxane,
prepared from 4-(β-<2-phenoxy-benzamido>-ethyl)-
benzenesulfonamide and cyclohexyl isothiocyanate by
boiling in acetone in the presence of potassium car-
bonate) are dissolved in a mixture of 40 ml. of dioxane
and 40 ml. of a 2N sodium hydroxide solution. 1 g. of
mercury oxide is added and the whole is stirred for 4
hours at about 60° C. When the reaction mixture has
cooled, the mercury sulfide that has formed is removed
by filtration with suction, the filtrate is diluted with water
and acidified. A crystalline precipitate constituting N-[4-
(β-<2-phenoxy-benzamido>-ethyl-benzene-sulfonyl]-
N'-cyclohexyl-urea is obtained which is filtered off with
suction, washed with water and recrystallized from
methanol. The substance melts at 168°–170° C.

b. 2 g. of N-[4-(β-<2-phenoxy-benzamido>-ethyl)-
benzenesulfonyl]-N'-cyclohexyl-thiourea are added,
while stirring, to 40 ml. of a 2N sodium hydroxide solu-
tion. The suspension thus obtained of the sodium salt of
the sulfonyl-thiourea that has formed is combined with 10
ml. of hydrogen peroxide having a strength of 35 percent
and the whole is heated for 30 minutes on the steam bath.
The reaction mixture is cooled, acidified with dilute
hydrochloric acid and the precipitate constituting N-[4-
(β-<2-phenoxy-benzamido>-ethyl)-benzenesulfonyl]-
N'-cyclohexyl-urea is filtered off with suction. After
washing with water the substance is recrystallized from
methanol. Melting point 168°–170° C.

EXAMPLE 5

N-[4-(β-<2-phenoxy-benzamido>-ethyl)-benzenesulfo-
nyl]-N'-cyclohexyl-urea a. 5.4 g. of N-[4-(β-<2-phenoxy-benzamido>-ethyl)-
benzene-sulfonyl]-N'-cyclohexyl-thiourea are dissolved
in 250 ml. of methanol. 2.16 g. of mercury oxide and a
pinch of potassium carbonate are added and the whole is
heated, while stirring and under reflux, to the boiling tem-
perature. After 4 hours the mercury sulfide that has
formed is separated by filtration with suction and the fil-
trate is concentrated.

The residue obtained constituting N-[4-(β-<2-phenoxy-
benzamido>-ethyl)-benzenesulfonyl]-N'-cyclohexyl-isourea
methyl ether crystallizes upon standing overnight. After
recrystallization from dilute methanol the substance melts at
92°–94° C.

b. 1 g. of the N-[4-(β-<2-phenoxy-benzamido>-ethyl)-
benzenesulfonyl]-N'-cyclohexyl-isourea methyl ether ob-
tained according to (a) are dissolved in a mixture of 20
ml. of dioxane and 30 ml. of a 2N sodium hydroxide solu-
tion. The whole is heated for 4 hours, while stirring and
under reflux, to 90° C., poured into water and acidified.
The precipitate obtained constituting N-[4-(β-<2-
phenoxy-benzamido>-ethyl)-benzenesulfonyl]-N'-
cyclohexyl-urea melts at 168°–170° C. after recrystalliza-
tion from methanol.

EXAMPLE 6

N-[4-(β-<2-phenoxy-benzamido>-ethyl)-benzenesulfo-
nyl]-N'-cyclohexyl-urea a. 9.9 g. of 4-(β-<2-phenoxy-benzamido>-ethyl)-
benzenesolfonamide are suspended in 30 ml. of ethanol
having a strength of 98 percent. A solution of 2.43 g. of
potassium cyanate in 5 ml. of water is added and the
whole is heated, for 2½ hours and under reflux, to the
boiling temperature. After about 30 minutes a clear solu-
tion is obtained from which crystals separate. After stand-
ing overnight, the crystal magma is combined with a large
quantity of ammonia having a strength of 1 percent,
whereupon the magma is almost completely dissolved.
The solution is filtered with animal charcoal and
acidified. The precipitate obtained, constituting N-[4-(β-
<2-phenoxy-benzamido>-ethyl)-benzenesulfonyl]-urea
is filtered off with suction and recrystallized from dilute
methanol. The dried substance melts at 155°–157° C.

b. 4.39 g. of the N-[4-(β-<2-phenoxy-benzamido>-ethyl-
benzenesulfonyl]-urea obtained according to (a) are
suspended in 40 ml. of dioxane, to this suspension 40 ml.
of dimethylformamide and 1 g. of cyclohexylamine are added. The whole is heated for about 4 hours and under reflux to the boiling temperature, poured into a large quantity of ammonia having a strength of 1 percent and the solution thus obtained is acidified with hydrochloric acid.

The precipitate constituting crude N-[4-(β-<2-phenoxy-benzamido>-ethyl)-benzenesulfonyl]-N'-cyclohexyl-urea is filtered off with suction and recrystallized from methanol. Melting point 168°–170° C.

EXAMPLE 7

N-[4-(γ-<-2-phenoxy-5-nitrobenzamido>-propyl)benzenesulfonyl]-N'-cyclohexyl-urea 16 g. of N-[4-(γ-acetamido-propyl)-benzenesulfonyl]-N'-cyclohexyl-urea are heated for 3 hours to 120° C. with 100 ml. of NaOH having a strength of 10 percent. After cooling the resulting mixture is acidified, filtered and the clear filtrate is neutralized by the addition of sodium bicarbonate. The N-[4-(γ-amino-propyl)-benzenesulfonyl]-N'-cyclohexyl-urea that has precipitated is recrystallized from aqueous methanol and melts at 188° C.

10 g. of this sulfonyl-urea are stirred for 12 hours, at 35°–40° C., with 6.6 g. of 2-chloro-5-nitro-benzoyl-chloride and 5 g. of pyridine in 80 ml. of chloroform. After removal of the chloroform under reduced pressure, the residue is dissolved in an aqueous soda solution having a strength of 1 percent, the solution is shaken with ether and acidified with hydrochloric acid. The N-[4-(γ-<-2-chloro-5-nitro-benzamido>-propyl)-benzenesulfonyl]-N'-cyclohexyl-urea obtained is recrystallized from methanol and melts at 176° C.

5 g. of this sulfonyl-urea are dissolved in 70 ml. of glycol monomethyl ether and this solution is combined with 3.7 g. of phenyl sodium; the whole is then heated for 30 minutes to 125° C. After cooling, the solution is poured into weakly hydrochloric ice water, the precipitate that has separated is extracted with ammonia having a strength of 1 percent, acidified again and recrystallized from ethanol. N-[4-(γ-<-2-phenoxy-5-nitro-benzamido>-propyl-benzenesulfonyl]-N'-cyclohexyl-urea melts at 90°–92° C.

EXAMPLE 8

N-[4-(β-<2-phenoxy-benzamido>-ethyl)-benzenesulfonyl]-N'-(2,5-ethyl)-benzenesulfonyl]

6 g. of N-[4-(β-<2-phenoxy-benzamido>-ethyl-benzenesulfonyl -N'-(2,5-endomethylene-cyclohexyl-methyl)-thiourea (melting point 183°–185° C., from dilute methanol, prepared by boiling for several hours 4-(β-<2-phenoxy-benzamido>ethyl)-benzenesulfonamide with 2,5-endomethylene-cyclohexyl-methyl isothiocyanate in dioxane in the presence of potassium carbonate) are suspended in 100 ml. of a 2N sodium hydroxide solution. 10 ml. of hydrogen peroxide having a strength of 35 percent are added and the whole is heated for 30 minutes on the steam bath. After cooling, the reaction solution is acidified, the crystal magma is filtered off with suction, washed with water and taken up in ethyl acetate. After separation of an aqueous layer, diisopropyl ether is added. The smeary product that has precipitated is separated by decanting the mixture of ethyl acetate and diisopropyl ether; it is then recrystallized from methanol. The N-[4-(β-<2phenoxy-benzamido>-ethyl)-benzenesulfonyl]-N'-(2,5-endomethylene-cyclohexyl-methyl)-urea thus obtained melts at 138°–140° C.

EXAMPLE 9

N-[4-(β-<2-phenoxy-benzamido>-ethyl)-benzenesulfonyl]-N'-cyclohexyl-urea 5.4 g. of N-[4-(β-<2-phenoxy-benzamido -ethyl)-benzenesulfonyl]-N'-cyclohexyl-thiourea are dissolved in 60 ml. of methanol. An excess quantity of methyl iodide is added and the whole is heated, for 45 minutes under reflux, to the boiling temperature and subsequently concentrated under reduced pressure. The residue constituting N-[4-(β-<2-phenoxy-benzamido>-ethyl-benzenesulfonyl]-isothiourea methyl ether is dissolved in methanol. 0.54 g. of sodium methylate are added and the whole is heated for 2 hours under reflux to the boiling temperature, poured into water and acidified with acetic acid. A crystalline precipitate constituting N-[4-(β-<2-phenoxy-benzamido>-ethyl-benzenesulfonyl]-N'-cyclohexyl-urea is obtained which is filtered off with suction and dried. The substance melts at 168°–170° C., after recrystallization from methanol.

We claim:
1. A benzenesulfonyl-urea of the formula

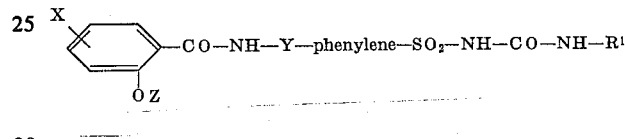

in which R¹ is alkyl of two to eight carbon atoms, cycloalkyl of five to eight carbon atoms in the ring, lower alkyl-cyclohexyl, endoalkylene-cyclohexenyl or endoalkylene-cyclohexyl-methyl having one to two carbon atoms in the endoalkylene moiety; Y is an alkylene of one to four carbon atoms; Z is phenyl or p-tolyl; and X is hydrogen, methyl, chloro or nitro substituted in the 4- or 5-position; or a salt thereof of a pharmaceutically acceptable base.

2. Benzenesulfonyl-ureas as claimed in claim 1, in which X is chlorine in 5-position to the carbon-amide group.

3. Benzenesulfonyl-ureas as claimed in claim 1, in which R¹ is cyclohexyl.

4. Benzenesulfonyl-ureas as claimed in claim 1, in which R¹ is 4-methyl-cyclohexyl.

5. Benzenesulfonyl-ureas as claimed in claim 1, in which X is methyl in 5-position.

6. Benzenesulfonyl-ureas as claimed in claim 1, in which "phenylene" is unsubstituted p-phenylene.

7. Benzenesulfonyl-ureas as claimed in claim 1, in which Y is dimethylene.

8. N-[4-(β-<2-phenoxy-benzamido>-ethyl)-benzenesulfonyl]-N'-(4-methyl-cyclohexyl)-urea.

9. N-[4-(β-<2-phenoxy-5-methyl-benzamido>-ethyl)-benzenesulfonyl]-N'-cyclohexyl-urea.

10. N-[4-(β-<2-phenoxy-benzamido>-ethyl)-benzenesulfonyl]-N'-cyclohexyl-urea.

11. N-[4-(β-<2-phenoxy-4-chloro-benzamido>-ethyl)-benzenesulfonyl]-N'-(4methyl-cyclohexyl)-urea.

12. N-[4-(β-<2-phenoxy-5-chloro-benzamido>-ethyl)-benzenesulfonyl]-N'-(4-methyl-cyclohexyl)-urea.

* * * * *